(12) United States Patent  
Pearson et al.

(10) Patent No.: US 9,258,945 B2
(45) Date of Patent: Feb. 16, 2016

(54) HANGER MOUNT FOR A RECIPROCATING SIEVE

(71) Applicant: DEERE & COMPANY, Moline, IL (US)

(72) Inventors: Mark L Pearson, LeClaire, IA (US); Jeffrey R Walter, Davenport, IA (US); James K Adamson, Colona, IL (US)

(73) Assignee: DEERE & COMPANY, Moline, IL (US)

( * ) Notice: Subject to any disclaimer, the term of this patent is extended or adjusted under 35 U.S.C. 154(b) by 68 days.

(21) Appl. No.: 14/032,809

(22) Filed: Sep. 20, 2013

(65) Prior Publication Data

US 2015/0087365 A1 Mar. 26, 2015

(51) Int. Cl.
*A01F 12/32* (2006.01)
*B07B 1/00* (2006.01)
*A01F 12/44* (2006.01)

(52) U.S. Cl.
CPC .................. *A01F 12/446* (2013.01)

(58) Field of Classification Search
CPC ....... A01F 12/448; A01F 12/32; A01F 12/44; A01F 12/446; A01F 12/34; A01F 12/36; A01D 75/282; A01D 41/1276; B07B 1/28; Y10S 460/902
USPC ............ 209/310, 399, 403, 398; 460/101, 92, 460/93, 901; 56/100, 101
See application file for complete search history.

(56) References Cited

U.S. PATENT DOCUMENTS

| | | | |
|---|---|---|---|
| 1,331,614 A | | 2/1920 | Bradshaw et al. |
| 2,105,986 A | * | 1/1938 | Petersen ........................ 209/394 |
| 2,345,947 A | * | 4/1944 | Parks ............................. 209/408 |
| 2,939,581 A | * | 6/1960 | Ashton .......................... 209/318 |
| 3,317,041 A | * | 5/1967 | Century ..................... B07B 1/40 209/315 |
| 3,334,744 A | * | 8/1967 | Howell et al. ................. 209/394 |
| 3,472,377 A | * | 10/1969 | Payne ............................ 209/394 |
| 3,800,803 A | * | 4/1974 | Rouse ............................ 460/101 |
| 4,632,751 A | * | 12/1986 | Johnson et al. ................ 209/326 |
| 4,736,753 A | * | 4/1988 | Glaubitz et al. .................. 460/9 |
| 4,770,190 A | * | 9/1988 | Barnett ......................... 460/102 |
| 5,338,257 A | * | 8/1994 | Underwood ....................... 460/8 |

(Continued)

FOREIGN PATENT DOCUMENTS

| | | |
|---|---|---|
| AU | 2011340799 A1 | 8/2013 |
| GB | 1309784 A | 3/1973 |

(Continued)

OTHER PUBLICATIONS

European Search Report issued in counterpart application No. 14181564.7, dated Feb. 5, 2015 (8 pages).

(Continued)

*Primary Examiner* — Árpád Fábián-Kovács

(57) ABSTRACT

A hanger mount (206, 208, 210, 212) is provided for a reciprocating sieve assembly (106, 108) having a left side longitudinal member (300, 308), a right side longitudinal member (302, 310), a forward transverse member (304, 312), and a rearward transverse member (306, 314), wherein the hanger mount is a unitary body that has and defines a hanger connection (1000, 1100, 1200, 1300) that is configured to be coupled to a reciprocating hanger (110, 112); a first mounting surface (1006, 1010, 1106, 1110, 1206, 1210, 1306, 1310) that is configured to be fixed to one of the longitudinal members (300, 308, 302, 310); and a second mounting surface (1025, 1125, 1225, 1325) that is configured to be fixed to one of the transverse members (304, 312, 306, 314).

16 Claims, 10 Drawing Sheets

(56) References Cited

U.S. PATENT DOCUMENTS

| | | | |
|---|---|---|---|
| 6,953,397 B2* | 10/2005 | Jonckheere | A01F 12/448 460/101 |
| 7,000,779 B2* | 2/2006 | Smook | B07B 1/14 209/395 |
| 7,322,882 B2* | 1/2008 | Duquesne | A01F 12/448 209/233 |
| 7,357,711 B1* | 4/2008 | Matousek et al. | 460/101 |
| 7,553,226 B2* | 6/2009 | Dhont | A01D 75/282 460/101 |
| 7,654,394 B2* | 2/2010 | LaVeine | B07B 1/28 209/310 |
| 7,927,199 B2* | 4/2011 | Adamson et al. | 460/101 |
| 7,946,908 B2* | 5/2011 | Lobdell et al. | 460/101 |
| 8,757,392 B2* | 6/2014 | LaVeine | B07B 1/28 209/319 |
| 2002/0195377 A1* | 12/2002 | Trench | B07B 1/284 209/365.1 |
| 2003/0140612 A1* | 7/2003 | Gorden | 56/100 |
| 2003/0186731 A1* | 10/2003 | Voss et al. | 460/101 |
| 2004/0112026 A1* | 6/2004 | Jonchkheere et al. | 56/101 |
| 2005/0274653 A1* | 12/2005 | LaVeine et al. | 209/310 |
| 2005/0282601 A1* | 12/2005 | Duquesne et al. | 460/101 |
| 2006/0270473 A1* | 11/2006 | Straeter | 460/99 |
| 2007/0249414 A1* | 10/2007 | Matousek et al. | 460/101 |
| 2008/0004092 A1* | 1/2008 | Nelson et al. | 460/101 |
| 2008/0169223 A1* | 7/2008 | Fennekotter | B07B 1/46 209/392 |
| 2008/0169224 A1* | 7/2008 | Fennekotter | B07B 1/46 209/405 |
| 2008/0318650 A1* | 12/2008 | Dhont et al. | 460/101 |
| 2009/0215510 A1* | 8/2009 | Schmidt et al. | 460/109 |
| 2010/0282649 A1* | 11/2010 | Angus | B07B 1/42 209/409 |
| 2014/0179381 A1* | 6/2014 | Murray et al. | 460/101 |

FOREIGN PATENT DOCUMENTS

| | | |
|---|---|---|
| RU | 2439872 C1 | 1/2012 |
| SU | 1423045 A1 | 9/1988 |
| SU | 1464957 A1 | 3/1989 |

OTHER PUBLICATIONS

Eurasian Search Report issued in counterpart application No. 201400934, dated Jan. 22, 2015 (2 pages).

* cited by examiner

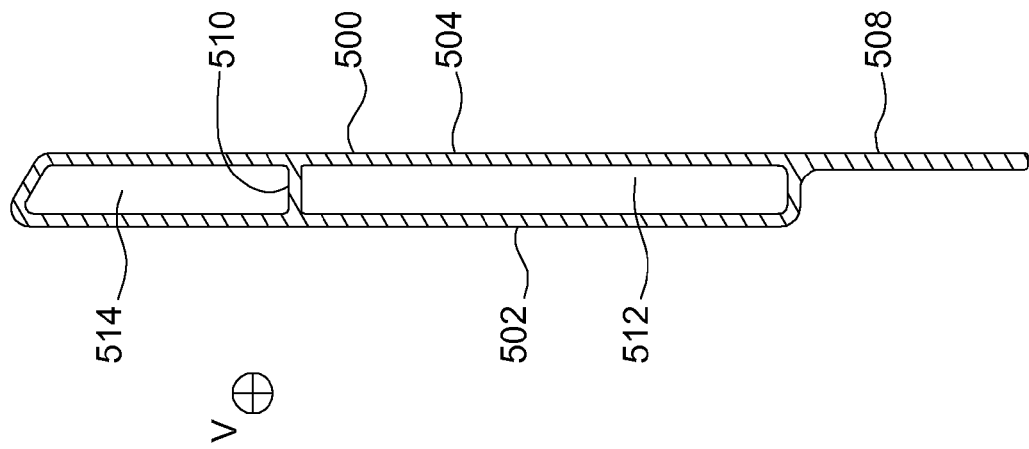
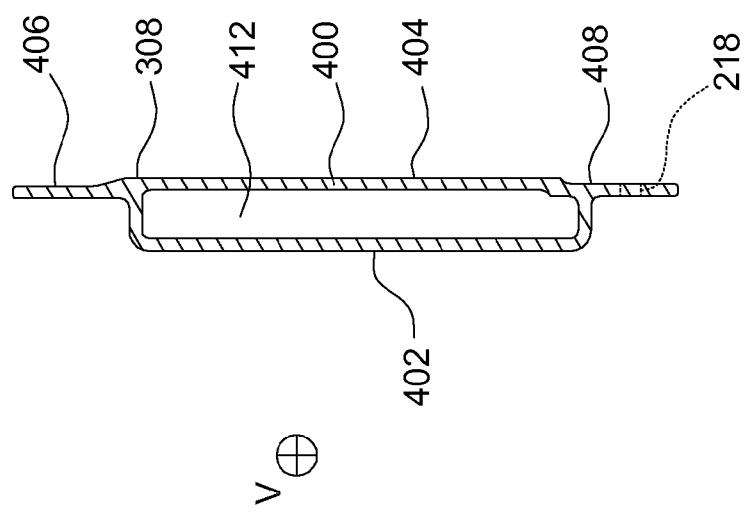

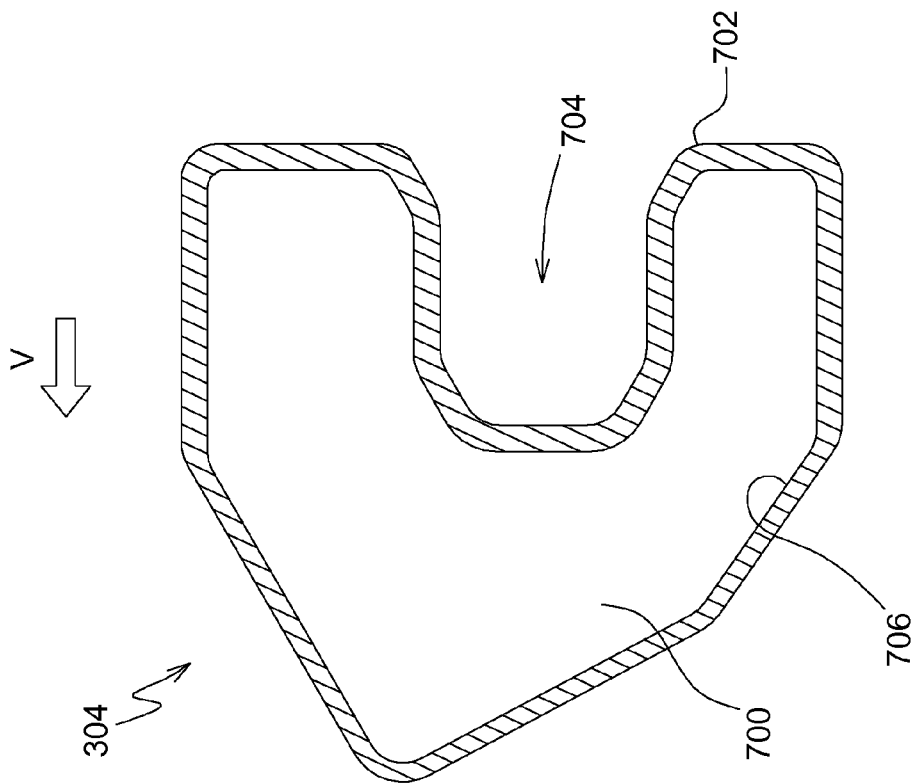
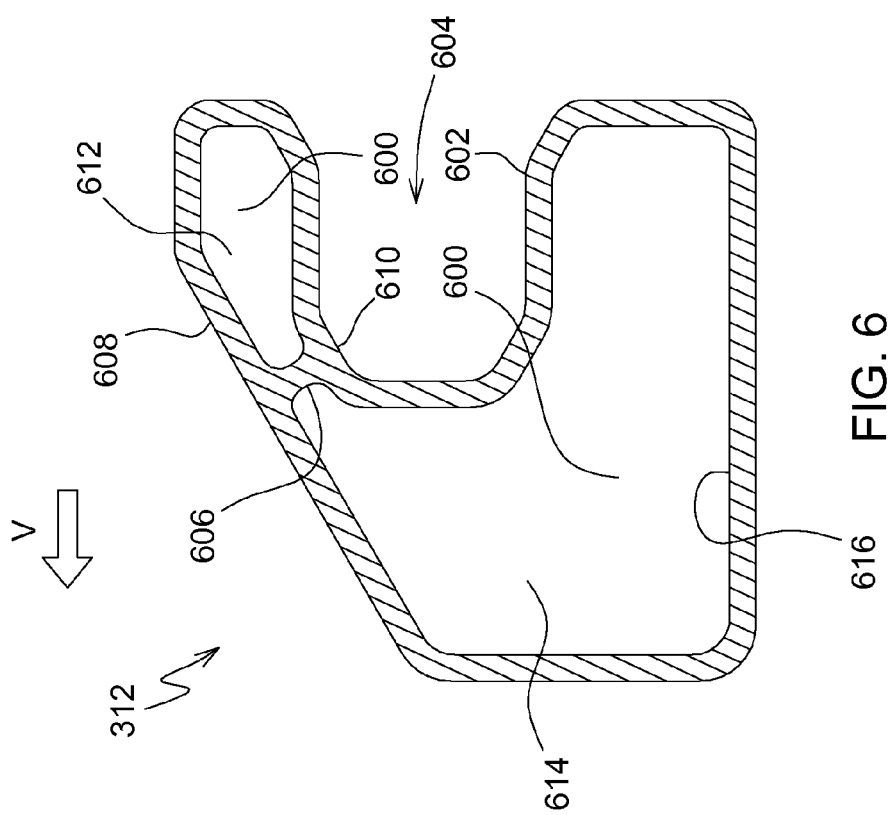

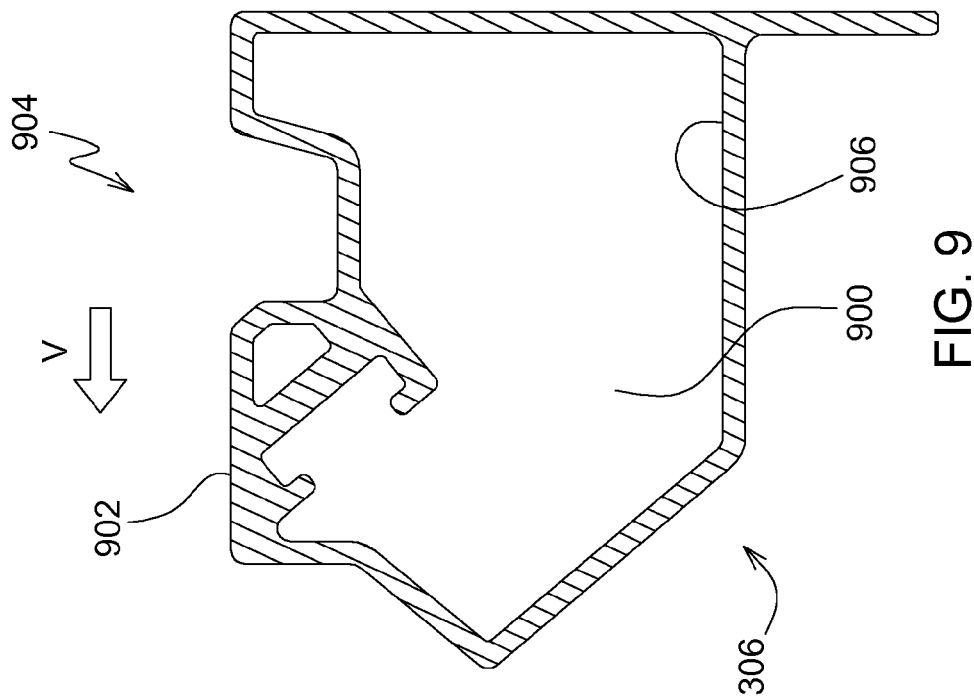
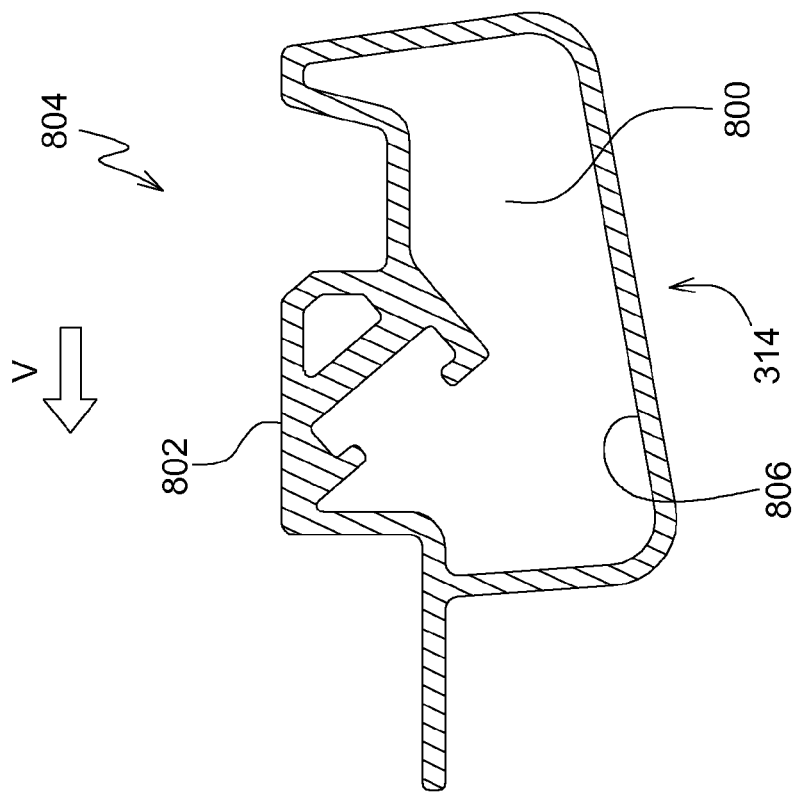

HANGER MOUNT FOR A RECIPROCATING SIEVE

FIELD OF THE INVENTION

This invention relates to agricultural harvesters (also known as "combines" or "combine harvesters"). In particular, it relates to cleaning shoes for agricultural harvesters. More particularly, it relates to hanger mounts for reciprocating sieves.

BACKGROUND OF THE INVENTION

Cleaning shoes are major subsections of agricultural harvesters. Cleaning shoes are generally constructed as a housing that encloses a fan and one or more reciprocating sieve assemblies. The fan generates a flow of air that passes upward through the sieve assembly as the sieve assembly reciprocates fore and aft. This airflow lifts material other than grain (MOG) such as chaff or dust and carries it rearward out of the agricultural harvester where it is deposited on the ground. The grain is dense enough that it resists this flow of air and is not carried rearward, but instead falls downward through the sieve assembly onto a pan that extends underneath the sieve assembly. A transverse conveyor in the pan carries the grain to one side of the agricultural harvester, and a vertical conveyor carries the grain upward and into a grain tank or reservoir located at the top of the agricultural harvester.

To assist the air in separating the grain from the MOG, the sieve assembly is reciprocated in a generally horizontal plane. The speed of reciprocation is on the order of 300 cycles per minute. A typical reciprocating sieve assembly comprises a generally rectangular frame that supports one or more sieves.

The sieves are generally formed as dozens of slats, each of which extends side to side with respect to the agricultural harvester. These slats are supported, in turn, in a second frame that is supported inside the generally rectangular frame.

The reciprocating sieve assembly is typically supported on hangers that extend generally vertically. The upper ends of the hangers are fixed to the chassis of the agricultural harvester. The lower ends of the hangers are fixed to the reciprocating sieve assembly. A power source, such as a motor with a rotating shaft, is connected to the hangers with an offset crank and rod arrangement. As the motor rotates, the hangers are pivoted fore-and-aft at their lower ends by the rod to shake the reciprocating sieve assemblies. This reciprocation jostles the dirty grain falling on the sieve, spreads the grain out more evenly across the surface of the sieve and enhances the flow of air through the dirty grain.

Cleaning shoe design, and particularly the design of the reciprocating sieve assemblies, is a trade-off between strength, durability and weight. The cyclical loading of the reciprocating sieve assemblies tends to cause fasteners to loosen. For this reason, the reciprocating sieve assemblies are typically welded together. Unfortunately, the welds are also prone to failure by metal fatigue due to the reciprocating loads placed on the individual members.

What is needed, therefore, is a new configuration for a reciprocating sieve assembly that weighs less and is more immune to the cyclical stresses.

It is an object of this invention to provide such an arrangement.

SUMMARY OF THE INVENTION

In accordance with one aspect of the invention, a hanger mount is provided for a reciprocating sieve assembly having a left side longitudinal member, a right side longitudinal member, a forward transverse member, and a rearward transverse member, wherein the hanger mount is a unitary body that has a hanger connection that is configured to be coupled to a reciprocating hanger; a first mounting surface that is configured to be fixed to one of the left side longitudinal member and the right side longitudinal member; and a second mounting surface that is configured to be fixed to one of the forward transverse member and the rearward transverse member.

The first mounting surface may be configured to abut and be fixed against a wall of said one of the left side longitudinal member and the right side longitudinal member.

The second mounting surface may be configured to abut and be fixed against a surface of said one of the forward transverse member and the rearward transverse member.

The first mounting surface may be normal to the second mounting surface.

The first mounting surface may be generally planar and extends longitudinally and vertically.

The first mounting surface may have a plurality of apertures extending therethrough.

Each of the plurality of apertures may extend in a direction normal to the first mounting surface.

Each of the plurality of apertures may be configured to receive a tubular fastener, and the tubular fastener may be selected from a group comprising a rivet, a bolt, or a rivnut.

The second mounting surface may have a plurality of apertures extending therethrough.

Each of the plurality of apertures may extend in a direction normal to the second mounting surface.

Each of the plurality of apertures may be configured to receive a tubular fastener, and the tubular fastener may be selected from a group comprising a tubular rivet, a bolt, or a rivnut.

The first mounting surface may be configured to be fixed to one of the left side longitudinal member and the right side longitudinal member with fasteners; and the second mounting surface may be configured to be fixed to one of the forward transverse member and the rearward transverse member with fasteners.

The first mounting surface may have a plurality of apertures and each of the plurality of apertures may be configured to receive a corresponding tubular fastener.

The second mounting surface may have a plurality of apertures, and each of the plurality of apertures may be configured to receive a corresponding tubular fastener.

At least one of the forward transverse member and the rearward transverse member may be an elongate extruded member that defines a closed hollow interior, and the second mounting surface may be disposed inside the closed hollow interior.

At least one of the left side longitudinal member and the right side longitudinal member may be an elongate extruded member that defines a first wall that is generally vertical, and the first mounting surface may be configured to be fixed to the first wall.

BRIEF DESCRIPTION OF THE DRAWINGS

FIG. 4 is a cross-sectional view of an elongate fore and aft extending extruded member of the lower sieve frame of FIG. 3 taken at section line 4-4 in FIG. 3.

FIG. 5 is a cross-sectional view of an elongate fore and aft extending frame member of the upper sieve frame of FIG. 3 taken at section line 5-5 in FIG. 3.

FIG. 6 is a cross-sectional view of an elongate laterally extending extruded member that is disposed at the front of and defines the front side of the lower sieve frame of FIG. 3. The cross-section is taken at section line 6-6 in FIG. 3.

FIG. 7 is a cross-sectional view of an elongate laterally extending extruded member that is disposed at the front of and defines the front side of the upper sieve frame of FIG. 3. The cross-section is taken at section line 7-7 in FIG. 3.

FIG. 8 is cross-sectional view of an elongate laterally extending extruded member that is disposed at the rear of and defines the rear side of the lower sieve frame of FIG. 3. The cross-section is taken at section line 8-8 in FIG. 3.

FIG. 9 is a cross-sectional view of an elongate laterally extending extruded member that is disposed at the rear of the upper sieve frame of FIG. 3. The cross-section is taken at section line 9-9 in FIG. 3.

DETAILED DESCRIPTION

In the discussion herein, the terms "side-to-side", "sideways", "laterally" or "lateral" refer to a direction that is perpendicular to a direction of travel "V" of the agricultural harvester on which the reciprocating sieve assemblies are mounted as the agricultural harvester travels through the field harvesting crops.

The terms "in front of", "front", "forward", "fore" and the like refer to the direction of travel "V".

The terms "back", "rear", "behind", "to the rear of" and the like refer to a direction opposite to the direction of travel "V".

The terms "inner", "inward" or "inwardly" refer to a lateral direction toward the lateral midpoint of the reciprocating sieve assemblies.

The terms "outer", "outward" or "outwardly" refer to a lateral direction away from the lateral midpoint of the reciprocating sieve assemblies.

The term "sieve" refers to a sieve, chaffer, screen or other device for separating grain from MOG that is configured to function by the passing of an air stream upward therethrough.

The term "fastener" refers to blind fasteners and tubular fasteners, such as bolts, screws, rivets, and rivnuts. In particular, if the fasteners are rivets they may be tubular rivets, typical of the type sold under brand names such as "Magna-Lok" and "Pop Rivets". "Tubular rivets" as that term is used herein refers to a tubular body with an outwardly extending flange at one end. A rod extends down the center of the tubular body. The rod has a head at one end. The tubular rivet is employed by inserting the rivet body into rivet holes and extracting the rod. The head is then pulled through the tubular body causing the tubular body to expand. This expansion causes the tubular body to abut the rivet holes thereby fixing the rivet in place.

Figure 1:
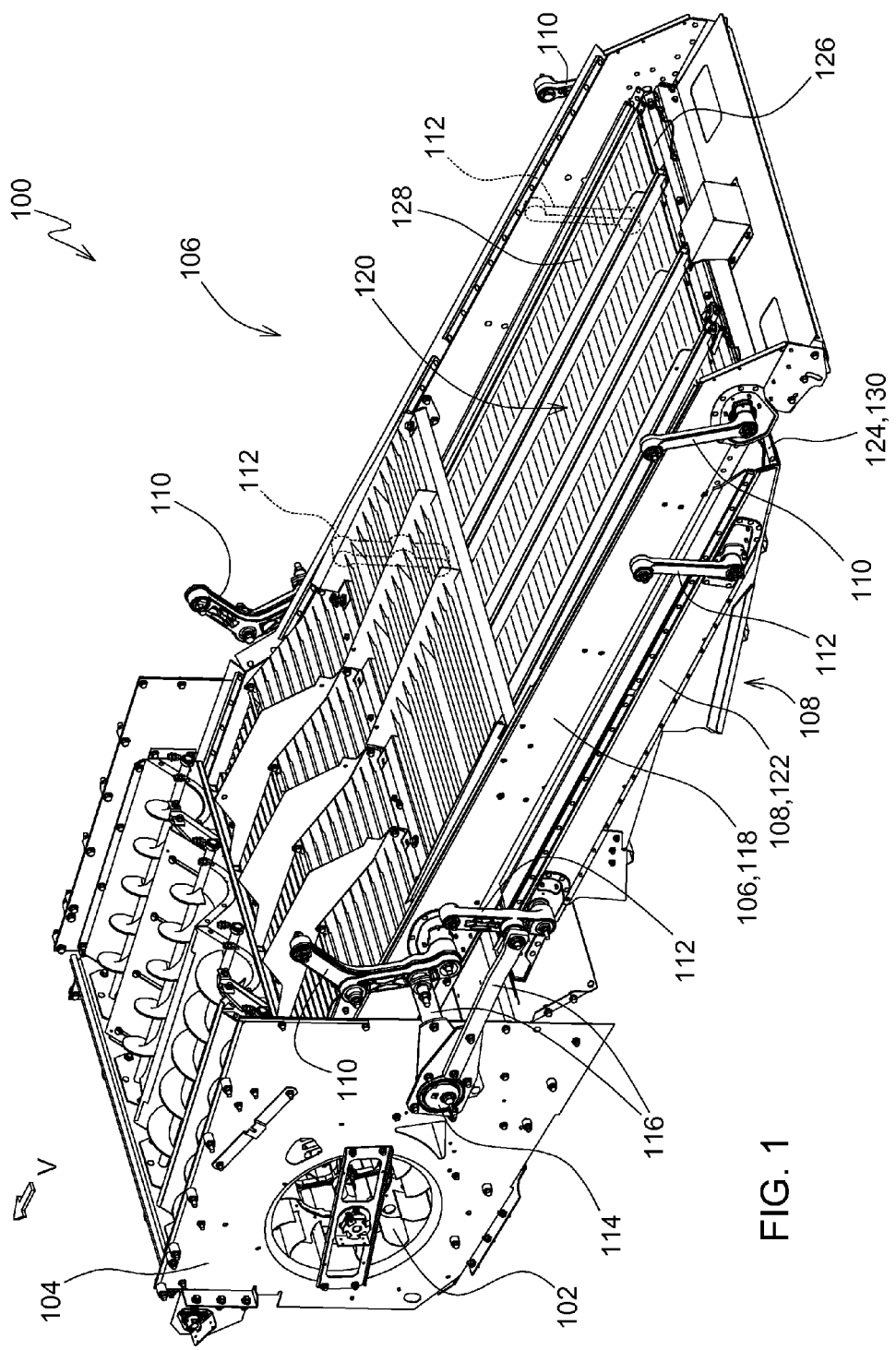
FIG. 1 is a left side perspective view of a cleaning shoe in accordance with the present invention.

In FIG. 1, a cleaning shoe 100 comprises a fan 102, a housing 104, and upper sieve assembly 106, a lower sieve assembly 108, hangers 110, hangers 112, a motor 114, and a drive crank 116.

Fan 102 extends laterally across substantially the entire width of the cleaning shoe. It generates an airflow that travels rearward toward the upper sieve assembly 106 and the lower sieve assembly 108. This air is conveyed upward through the upper sieve assembly 106 and the lower sieve assembly 108, levitating MOG and carrying it rearward and out of the agricultural harvester.

The housing 104 supports the fan and the motor 114.

The upper sieve assembly 106 comprises a frame 118 that is generally rectangular and an upper sieve 120 that is supported in the frame 118.

The lower sieve assembly 108 comprises a frame 122 and a lower sieve 124 that is supported in the frame 122.

Each hanger 110 has an upper end and a lower end. The upper end is pivotally coupled to the chassis (not shown) of the agricultural harvester. The lower end is pivotally coupled to the upper sieve assembly 106. By this arrangement, the upper sieve assembly 106 is suspended to pivot generally fore and aft. The hangers 110 are disposed in a generally rectangular arrangement, to support the left front, left rear, right front, and right rear of the upper sieve assembly 106. Thus, the hangers 110 are disposed at and support the upper sieve assembly 106 at the four corners of the upper sieve assembly 106 disposed at and support the upper sieve assembly 106 at the four corners of the upper sieve assembly 106.

Each hanger 112 has an upper end and a lower end. The upper end is pivotally coupled to the chassis (not shown) of the agricultural harvester. The lower end is pivotally coupled to the lower sieve assembly 108. By this arrangement the upper sieve assembly 106 is suspended to pivot generally fore-and-aft. The hangers 112 are disposed in a generally rectangular arrangement to support the left front, left rear, right front, and right rear of the lower sieve assembly. Thus, the hangers 112 are disposed at and support the lower sieve assembly 108 at the four corners of the lower sieve assembly 108.

The upper sieve 120 comprises a sieve frame 126 that supports a fore-and-aft extending array of laterally extending slats 128.

The sieve frame 126 is generally rectangular and is removably supported in the frame 118 of the upper sieve assembly 106.

The slats 128 extend laterally and parallel to each other and are disposed in a fore-and-aft extending array. The slats 128 are pivotally supported at their opposing ends on the sieve frame 126 to pivot with respect to the sieve frame 126 about their respective longitudinal and laterally extending axes.

The lower sieve 124 comprises a sieve frame 130 and slats (not shown) that are constructed the same as the upper sieve 120.

The sieve frame 130 is generally rectangular and is removably supported in the frame 122 of the lower sieve assembly 108.

The slats of the lower sieve 124 (not shown) are configured, arranged, and supported in the sieve frame 130 the same as the slats 128 are supported in the sieve frame 126 of the upper sieve 120.

Figure 2:
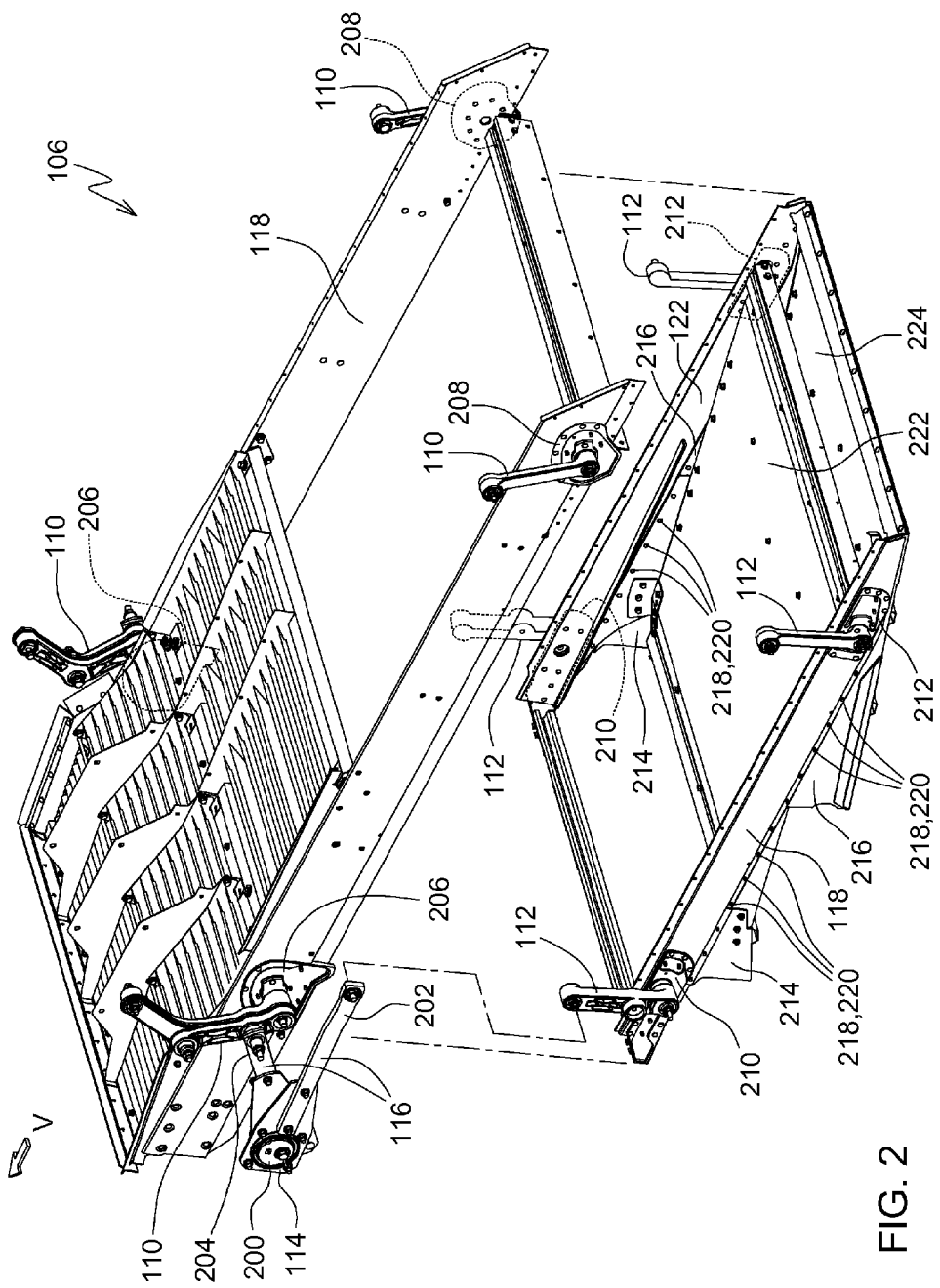
FIG. 2 is a left side exploded perspective view of two reciprocating sieve assemblies of the cleaning shoe of FIG. 1.

In FIG. 2, the upper sieve assembly 106 is shown with the upper sieve 120 removed. The lower sieve assembly 108 is shown with the lower sieve 124 removed. The upper ends of the hangers 110 and the hangers 112 are stationary, and are fixed to the chassis of the agricultural harvester. The lower ends of the hangers 110 and the lower ends of the hangers 112 pivot fore-and-aft. The motor 114 is driven in rotation causing an eccentric hub 200 mounted on the end of the motor 114, to rotate off-center. The eccentric hub 200 is supported on a bearing at the forward end of the drive crank 116, which causes the forward end of the drive crank 116 to follow an eccentric path.

A first rear portion 202 of the drive crank 116 is coupled to a central region of the hanger 112. A second rear portion 204 of the drive crank 116 is coupled to a central region of the hanger 110.

As first rear portion 202 and the second rear portion 204 of the drive crank 116 are driven fore-and-aft in reciprocating movement, they cause the lower ends of the hangers 112 and the lower ends of the hangers 110, respectively, to pivot in a shallow arc, in a generally fore and aft direction.

Referring to the upper sieve assembly 106, the lower end of each forward hanger 110 is rotationally coupled to a corresponding forward hanger mount 206. The lower end of each rear hanger 110 is rotationally coupled to a corresponding rear hanger mount 208.

Referring to the lower sieve assembly 108, the lower end of each forward hanger 112 is rotationally coupled to a corresponding forward hanger mount 210. The lower end of each rear hanger 112 is rotationally coupled to a corresponding rear hanger mount 212.

The two forward hanger mounts 206 are mirror images of each other. The two rear hanger mounts 208 are mirror images of each other. The two forward hanger mounts 210 are mirror images of each other. The two rear hanger mounts 212 are mirror images of each other.

Bearings, bushings, and/or other resilient members are disposed between the lower ends of the hangers 110 and the hangers 112 and the respective hanger mounts. These bearings, bushings, and/or other resilient members permit a small relative movement between the hangers 110 and the hangers 112 in their respective hanger mounts as the upper sieve assembly 106 and the lower sieve assembly 108 are reciprocated fore-and-aft.

Figure 3:
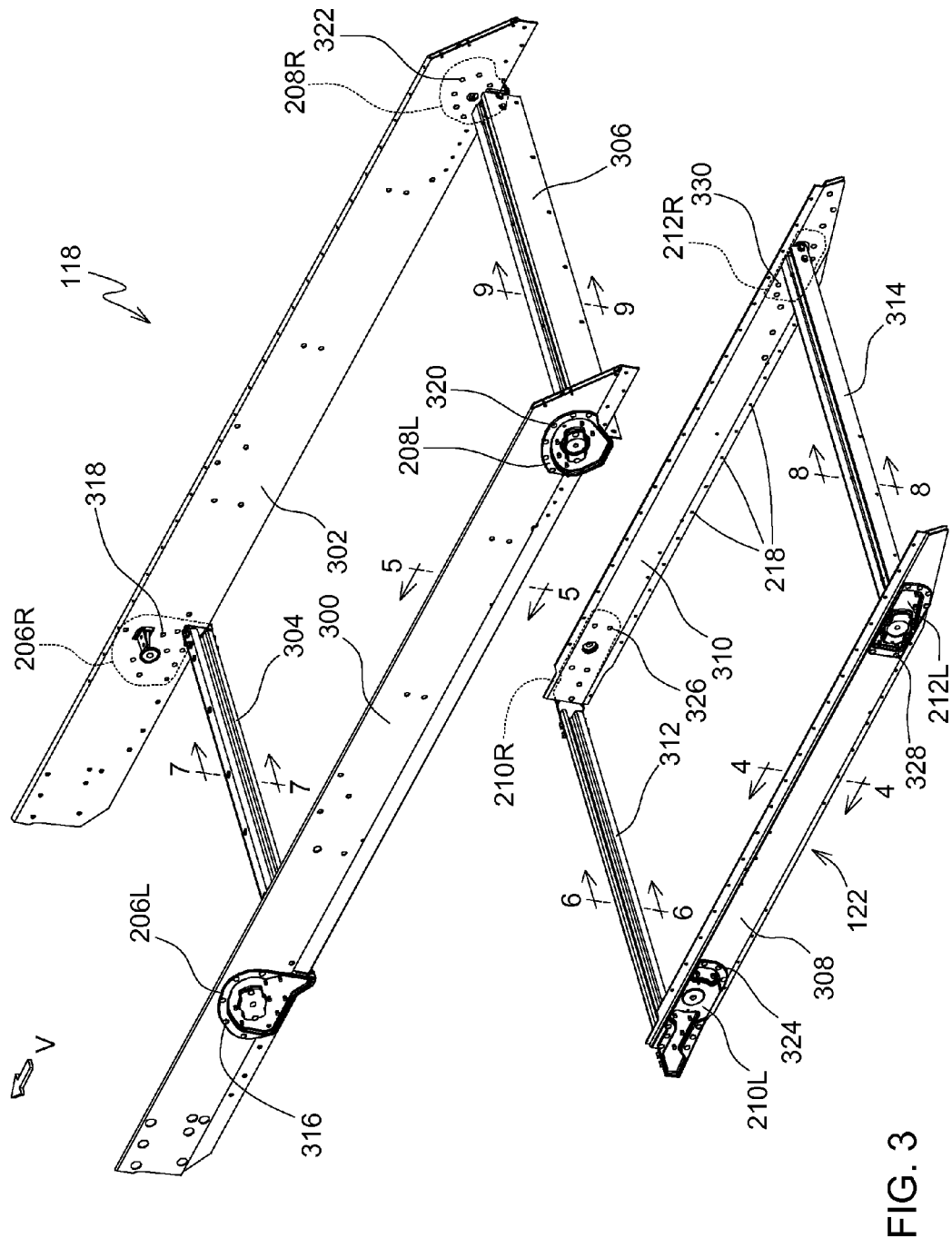
FIG. 3 is a left side exploded perspective view of the sieve frames of the two reciprocating sieve assemblies of the cleaning shoe of FIGS. 1-2.

Brackets 214 and brackets 216 are fixed along their respective upper edges to a plurality of apertures 218. The apertures 218 are formed in a lower portion of the elongate member 308, and are formed in a lower portion of the elongate member 310 (FIG. 3). Apertures 218 are spaced apart, generally evenly, and are oriented in a line extending along the lower portion of the elongate member 308 and the lower portion of the elongate member 310 (FIG. 3).

A plurality of fasteners 220 is provided to attach the brackets 214 and the brackets 216 to the elongate member 308 and the elongate member 310. Each of a plurality of fasteners 220 extends through a corresponding one of the plurality of apertures 218 and also extends through a corresponding one of a plurality of apertures 221. The plurality of apertures 221 are formed in the upper edges of the brackets 214 and the brackets 216.

The brackets 214 and the brackets 216 are oriented generally vertically. The brackets 214 and the brackets 216 extend downward below the bottom of elongate member 308 and the bottom of elongate member 310. The brackets 214 and the brackets 216 are fixed at their lower ends to opposing lateral sides of a grain pan 222 and a grain pan 224, respectively.

The grain pan 222 and the grain pan 224 are generally planar and extend both laterally and fore and aft. The grain pan 222 and the grain pan 224 are supported by the brackets 214 and the brackets 216, respectively, to be disposed at least partially below the bottom of elongate member 308 and the bottom of elongate member 310. In this position, they are configured to receive grain that has passed through and has fallen downward from the lower sieve (124).

The brackets 214 and the brackets 216 are configured to support the grain pan 222 and the grain pan 224 at a downwardly and forwardly sloping angle with respect to the longitudinal direction of the elongate member 308 and the elongate member 310.

The brackets 214, the brackets 216, the grain pan 222, and the grain pan 224 are made of sheet metal, more particularly ferrous sheet metal, and more particularly rolled steel sheet metal. The brackets 214, the brackets 216, the grain pan 222 and the grain pan 224 may be made of high-strength sheet metal having a strength of at least 30 kilo pounds per square inch (kpsi), more preferably at least 50 kpsi, and more preferably at least 80 kpsi.

FIG. 3 illustrates the frame 118 for the upper sieve assembly 106 and the frame 122 for the lower sieve assembly 108.

The frame 118 is generally rectangular, and comprises an elongate member 300 that extends fore-and-aft and forms the left side of the frame 118, an elongate member 302 that extends fore and ft and forms the right side of the frame 118, an elongate cross member 304 that extends laterally and forms the front side of the frame 118, and an elongate cross member 306 that extends laterally and forms the rear side of the frame 118.

Similarly, the frame 122 is generally rectangular, and comprises an elongate member 308 that extends fore-and-aft informs the left side of the frame 122, and elongate member 310 that extends fore-and-aft and forms the right side of the frame 122, an elongate cross member 312 that extends laterally and forms the front side of the frame 122, and an elongate cross member 314 that extends laterally and forms the rear side of the frame 122.

The elongate member 300, the elongate member 302, the elongate cross member 304, the elongate cross member 306, the elongate member 308, the elongate member 310, the elongate cross member 312, and the elongate cross member 314 are extruded members. They are comprised of a light metal such as aluminum, magnesium, titanium, or alloys thereof.

The elongate member 300 and the elongate member 302 are mirror images of each other. The elongate member 308 and the elongate member 310 are mirror images of each other.

The hanger mount 206L is fixed to the forward end of the elongate member 300 with a plurality of fasteners 316. The hanger mount 206R is fixed to the forward end of the elongate member 302 with a plurality of fasteners 318. The hanger mount 208L is fixed to the rear end of the elongate member 300 with a plurality of fasteners 320. The hanger mount 208R is fixed to the rear end of the elongate member 302 with a plurality of fasteners 322.

The hanger mount 210L is fixed to the forward end of the elongate member 308 with a plurality of fasteners 324. The hanger mount 210R is fixed to the forward end of the elongate member 310 with a plurality of fasteners 326. The hanger mount 212L is fixed to the rear end of the elongate member 308 with a plurality of fasteners 328. The hanger mount 212R is fixed to the rear end of the elongate member 310 with a plurality of fasteners 330.

Gaskets, adhesives, spacers or other arrangements may be provided between the hanger mounts and the elongate members to provide a more rigid connection and reduce chafing and wear between the hanger mounts and the elongate members.

FIG. 4 illustrates a cross-section of the elongate member 308. Elongate member 308 is elongate in the direction of travel "V". The elongate member 308 has a tubular center section 400 with an outer wall 402 and an inner wall 404 that are generally parallel and define the two elongate and vertical sides of the tubular center section 400. Elongate member 308 has a vertically extending upper flange 406 that extends from the upper part of the tubular center section 400. The elongate member 308 has a vertically extending lower flange 408 that extends from the lower part of the tubular center section 400.

The tubular center section 400 defines a hollow interior region 412 that is taller than it is wide. In one arrangement, the hollow interior region 412 is at least three times as tall as it is wide. In an alternative arrangement it is at least five times as tall as it is wide. In an alternative arrangement it is at least seven times as tall as it is wide. In an alternative arrangement it is at least nine times as tall as it is wide. These alternative arrangements can be shown by shortening or lengthening in a vertical direction the outer wall 402 and the inner wall 404. The elongate member 308 is an extrusion, and therefore all of the walls shown in the cross-section extend substantially the entire length of the elongate member 308 except in regions where they have been machined away by subsequent machining operations.

FIG. 5 illustrates a cross-section of the elongate member 300. Elongate member 300 is elongate in the direction of travel "V". Elongate member 300 has a tubular center section 500 with an outer wall 502 and an inner wall 504 that are generally parallel and define the two elongate and vertical sides of the tubular center section 500. Elongate member 300 has a vertically extending lower flange 508 that extends from the lower part of the tubular center section 500.

The tubular center section 500 defines a hollow interior that is at least three times taller than it is wide. In an alternative arrangement it is at least five times as tall as it is wide. In an alternative arrangement is at least seven times as tall as it is wide. In an alternative arrangement it is at least nine times as tall as it is wide. In an alternative arrangement it is at least 12 times as tall as it is wide.

A strut 510 extends between and is fixed to the outer wall 502 and the inner wall 504. The strut 510 is oriented generally horizontally and perpendicular to the outer wall 502 and inner wall 504. The strut 510 divides the tubular center section 500 into two subsections 512 and 514.

FIG. 6 illustrates a cross-section of the elongate cross member 312. Elongate cross member 312 extends and is elongate in a lateral direction. The longitudinal extent of elongate cross member 312 is normal (FIG. 3) to the inner and outer surfaces of the inner wall 404 and the inner and outer surfaces of the outer wall 402 of elongate member 308 and elongate member 310. Elongate cross member 312 is formed as an elongate extrusion having a hollow interior region 600 that extends over substantially its entire length. Elongate cross member 312 has a constant cross-sectional profile over substantially its entire length. An exterior wall 602 faces rearward and is provided with a rear-facing elongate recess 604 that extends over substantially its entire length. The rear-facing elongate recess 604 is configured to receive and support an elongate and laterally extending leading edge of the lower sieve frame 130. A strut 606 is provided between a first wall 608 and a second wall 610 of the elongate cross member 312. The strut 606 serves to provide rigidity to the elongate cross member 312 and to divide the hollow interior region 600 into a first region 612 and a second region 614. The first wall 608 forms a part of the outwardly facing surface of the elongate cross member 312. The second wall 610 forms a part of the rear-facing elongate recess 604. The hollow interior region 600 defines an enclosed interior surface 616 which abuts and is fixed against corresponding surfaces on the hangar mounts 210 (e.g. 210L and 210R).

FIG. 7 illustrates a cross-section of the elongate cross member 304. Elongate cross member 304 extends and is elongate in a lateral direction. The longitudinal extent of elongate cross member 304 is normal (FIG. 3) to the inner and outer surfaces of the outer wall 502 and the inner and outer surfaces of the inner wall 504 of elongate member 300 and of elongate member 302.

Elongate cross member 304 is formed as an elongate extrusion having a hollow interior region 700 that extends over substantially its entire length. Elongate cross member 304 has a constant cross sectional profile over substantially its entire length. An exterior wall 702 faces rearward and is provided with a rear-facing and elongate recess 704 that extends over substantially its entire length. The elongate recess 704 is configured to receive and support an elongate and laterally extending leading edge of the upper sieve frame 126. The hollow interior region 700 defines an enclosed interior surface 706 which abuts and is fixed against corresponding surfaces on the hanger mounts 206 (e.g. 206L and 206R).

FIG. 8 illustrates a cross-section of the elongate cross member 314. Elongate cross member 314 extends and is elongate in a lateral direction. The longitudinal extent of elongate cross member 314 is normal (FIG. 2) to the inner and outer surfaces of the inner wall 404 and the inner and outer surfaces of the outer wall 402 of the elongate member 308 and of the elongate member 310. Elongate cross member 314 is formed as an elongate extrusion having a hollow interior region 800 that extends over substantially its entire length. Elongate cross member 314 has a constant cross sectional profile over substantially its entire length. An exterior wall 802 faces upwardly and is provided with an upward-facing elongate recess 804 that extends over substantially its entire length. The upward-facing elongate recess 804 is configured to receive and support an elongate and laterally extending trailing edge of the lower sieve frame 130. The hollow interior region 800 defines an enclosed interior surface 806 which abuts and is fixed against corresponding surfaces on the hangar mounts 212 (e.g. 212L and 212R).

FIG. 9 illustrates a cross-section of the elongate cross member 306. Elongate cross member 306 extends and is elongate in a lateral direction. The longitudinal extent of elongate cross member 306 is normal (FIG. 3) to inner wall 404 and outer wall 402 of elongate member 300 and elongate member 302. Elongate cross member 306 is formed as an elongate extrusion having a hollow interior region 900 that extends over substantially its entire length. Elongate cross member 306 has a constant cross sectional profile over substantially its entire length. An exterior wall 902 faces upwardly and is provided with an upward facing elongate recess 904 that extends over substantially its entire length. The elongate recess 904 is configured to receive and support an elongate and laterally extending trailing edge of the upper sieve frame 126. The hollow interior region 900 defines an enclosed interior surface 906 which abuts and is fixed against corresponding surfaces on the hanger mounts 208 (e.g. 208L and 208R).

Figure 10:
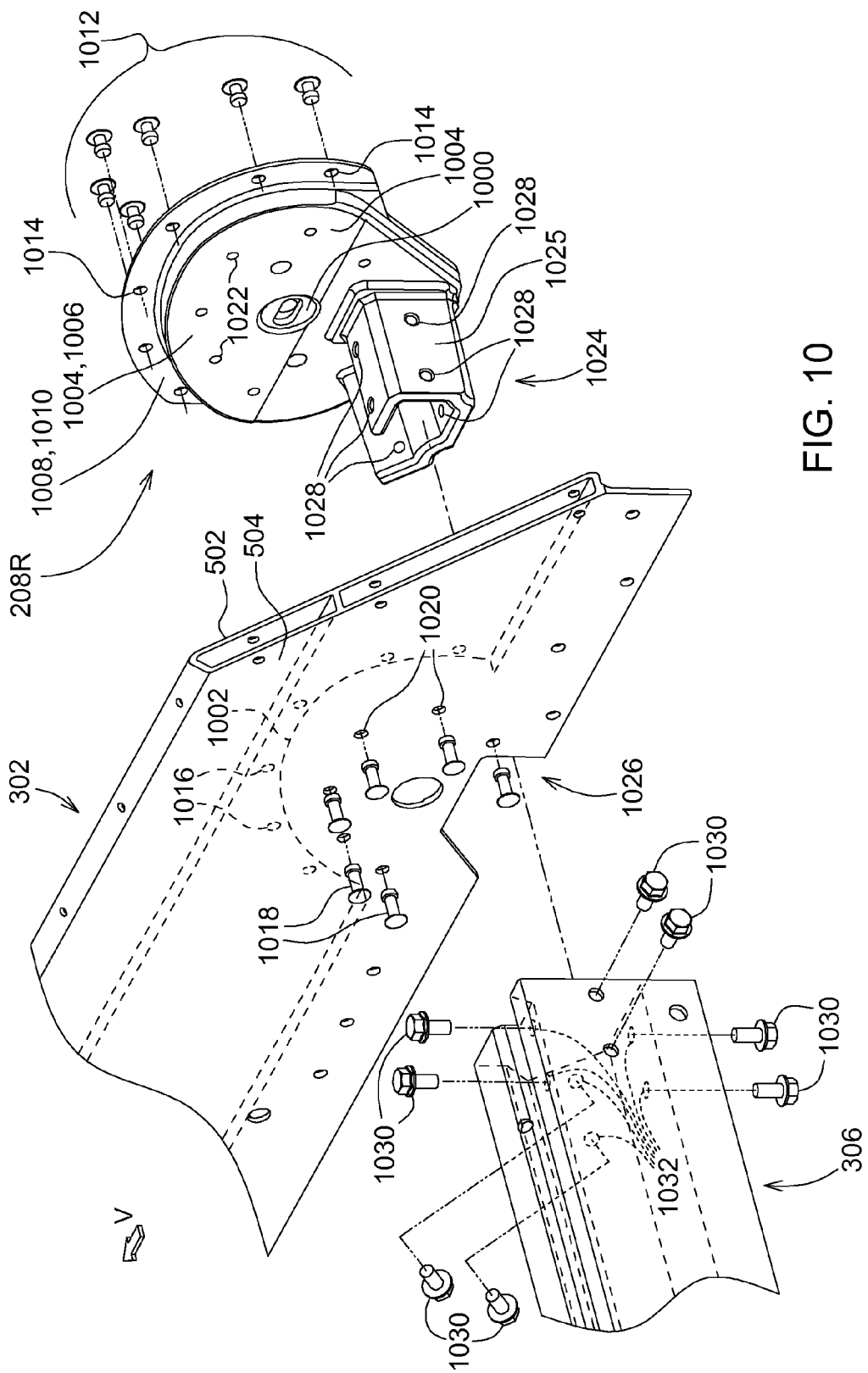
FIG. 10 is a fragmentary exploded perspective view of the right rear corner of the upper sieve frame of FIG. 3.

FIG. 10 is an exploded view of the hanger mount 208R, the elongate member 302, and the elongate cross member 306 together with the plurality of fasteners 322. The hanger mount 208R is identical in construction to the hanger mount 208L, but is a mirror image. Thus, the hanger mount and fastener arrangement of the rear of elongate member 302 shown in FIG. 10 is functionally and structurally identical to the hanger mount and fastener arrangement at the rear of the elongate member 300.

Hanger mount 208R is comprised of metal, for example a ferrous metal, such as steel, iron, or nodular iron. It may also be a light metal alloy. Hanger mount 208R has a hanger connection 1000 that is configured to be coupled to and support the hanger 110 (FIG. 2) for reciprocating movement with respect to the hanger mount 208R. The hanger mount 208R is configured to be received inside an aperture 1002 that is machined into the outer wall 502 of the elongate member.

The hanger mount 208R defines a first, inner flange 1004 having a generally planar mounting surface 1006 that is configured to abut and be fixed against the inner wall 504. The hanger mount 208R defines a second, outer flange 1008 that defines a generally planar mounting surface 1010 that is configured to abut and be fixed against the outer wall 502. The portion of the generally planar mounting surface 1006 that abuts the inner wall 504 and the portion of the generally planar mounting surface 1010 that abuts the surface of the outer wall 502 are parallel.

The plurality of fasteners 322 includes a first plurality of fasteners 1012, (shown as blind rivets), that extend through a corresponding plurality of apertures 1014 formed in the second, outer flange 1008 and are received into a corresponding plurality of apertures 1016 formed in the outer wall 502 of elongate member 302. The plurality of fasteners 322 includes a second plurality of fasteners 1018 that are configured to extend through a corresponding plurality of apertures 1020 formed in the inner wall 504 and are received into a corresponding plurality of apertures 1022 in the first, inner flange 1004. Thus, the hanger mount 208R is fixed to the elongate member 302. Each of the first plurality of fasteners 1012 and the second plurality of fasteners 1018 have longitudinal axes that are parallel and extend laterally, parallel to the longitudinal extent of the elongate cross member 306.

The hanger mount 208R defines an elongate, laterally-extending mount 1024. Mount 1024 extends through an aperture 1026 in the elongate member 302. It is fixed at its outer end to inner flange 1004, and its inner end is cantilevered into the space between the elongate member 300 and the elongate member 302. An outer surface 1025 of the mount 1024 is configured to abut and be fixed against the enclosed interior surface 906 of the elongate cross member 306.

The outer surface 1025 of the mount 1024 is preferably machined such that when the mount 1024 is inserted into the free end of the elongate cross member 306, it is fitted closely to the enclosed interior surface 906. The outer surface 1025 extends in a transverse direction and normal to the surfaces of the inner wall 504 and the outer wall 502 to which the hanger mount 208R is also fixed. The outer surface 1025 comprises a plurality (4) of flat surfaces that are joined to adjacent flat surfaces at corners. The flat surfaces are machined after the hanger mount 208R has been cast. Each of the flat surfaces is disposed at an angle to its adjacent flat surfaces.

The mount 1024 has a plurality (8) of apertures 1028 passing therein that are configured to receive a corresponding third plurality of fasteners 1030 of the first plurality of fasteners 322. Each of the flat surfaces that define the outer surface 1025 has two of the apertures 1028.

The mount 1024 extends inwardly through the inner wall 504 far enough to be received in an open end of the elongate cross member 306. In this position, each of the three flat surfaces that define the outer surface 1025 abuts a corresponding and parallel flat surface defined on the inside surface of the elongate cross member 306. The third plurality of fasteners 1030 (shown here as bolts) extend through a plurality of apertures 1032. The plurality of apertures 1032 extend through the outer wall of elongate cross member 306 and into the hollow interior region 900 of the elongate cross member 306. Having passed through the plurality of apertures 1032, the third plurality of fasteners 1030 are fixed to the mount 1024 by being received in plurality of apertures 1028. In this manner, fasteners extend through the wall of the elongate cross member 306, and are fixed to the mount 1024, thereby securing the mount 1024 to the elongate cross member 306.

Figure 11:
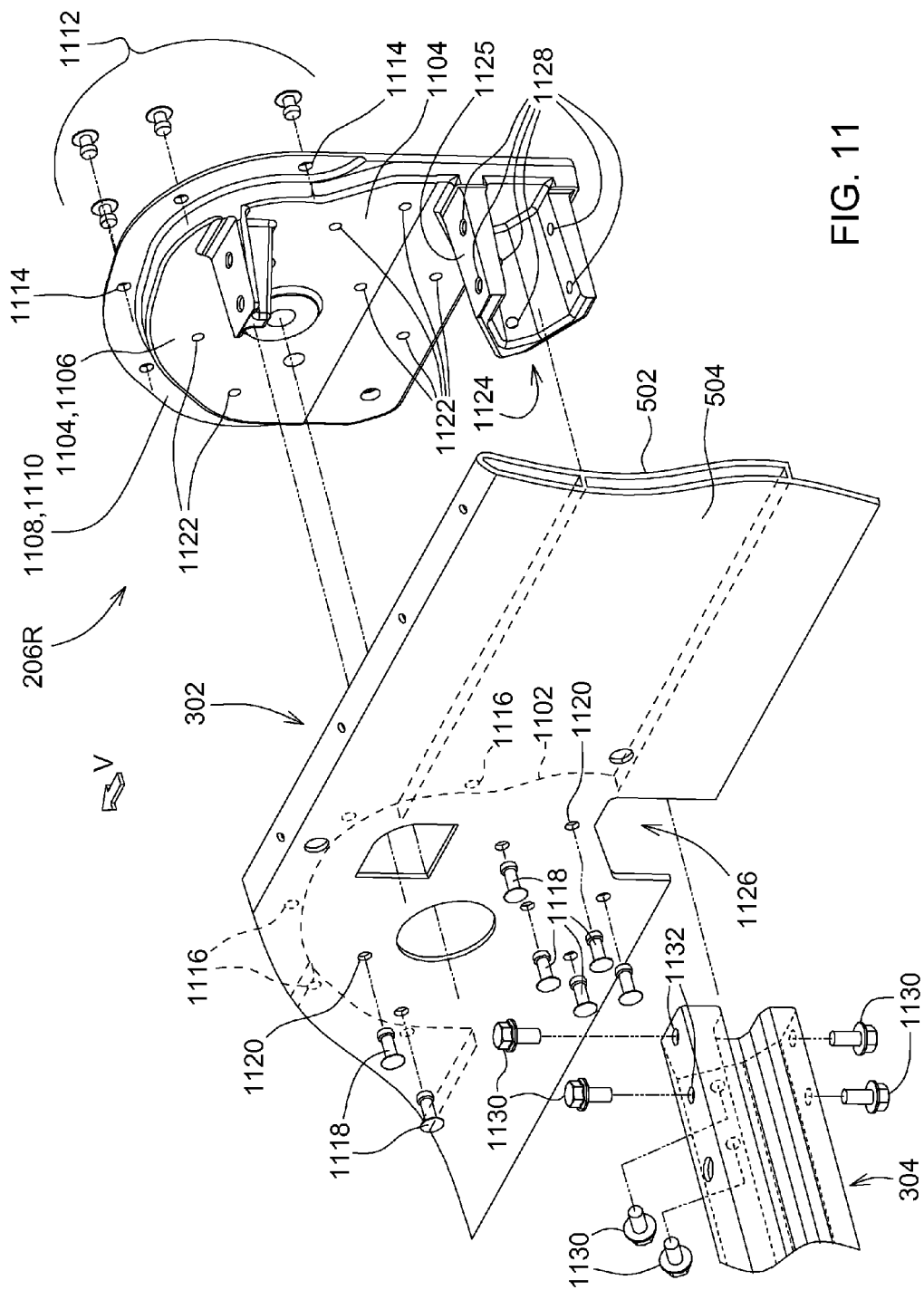
FIG. 11 is a fragmentary exploded perspective view of the right front corner of the upper sieve frame of FIG. 3.

FIG. 11 is an exploded view of the hanger mount 206R, the elongate member 302, and the elongate cross member 304 together with the plurality of fasteners 318. The hanger mount 206R is identical in construction to the hanger mount 206L, but is a mirror image. Thus, the hanger mount and fastener arrangement of the front of elongate member 302 shown in FIG. 11 is functionally and structurally identical to the hanger mount and fastener arrangement at the front of the elongate member 300.

Hanger mount 206R is comprised of metal, for example a ferrous metal, such as steel, iron, or nodular iron. It may also be a light metal alloy. Hanger mount 206R has a hanger connection 1100 that is configured to be coupled to and support the hanger 110 (FIG. 2) for reciprocating movement with respect to the hanger mount 206R. The hanger mount 206R is configured to be received inside an aperture 1102 that is machined into the outer wall 502 of the elongate member 302.

The hanger mount 206R defines a first, inner flange 1104 has a generally planar mounting surface 1106 that is configured to abut and be fixed against the inner wall 504. The hanger mount 206R defines a second, outer flange 1108 that defines a generally planar mounting surface 1110 that is configured to abut and be fixed against the outer wall 502. The portion of the generally planar mounting surface 1106 that abuts the inner wall 504 and the portion of the generally planar mounting surface 1110 that abuts the surface of the outer wall 502 are parallel.

The plurality of fasteners 318 includes a first plurality of fasteners 1112, (shown as blind rivets), that extend through a corresponding plurality of apertures 1114 formed in the second, outer flange 1108 and are received into a corresponding plurality of apertures 1116 formed in the outer wall 502 of elongate member 302. The plurality of fasteners 318 includes a second plurality of fasteners 1118 that are configured to extend through a corresponding plurality of apertures 1120 formed in the inner wall 504 and are received into a corresponding plurality of apertures 1122 in the first, inner flange 1104. Thus, the hanger mount 206R is fixed to the elongate member 302. Each of the first plurality of fasteners 1112 and the second plurality of fasteners 1118 have longitudinal axes that are parallel and extend laterally, parallel to the longitudinal extent of the elongate cross member 304.

The hanger mount 206R defines an elongate, laterally-extending mount 1124. Mount 1124 extends through an aperture 1126 in the elongate member 302. It is fixed at its outer end to inner flange 1104, and its inner end is cantilevered into the space between the elongate member 300 and the elongate member 302. An outer surface 1125 of the mount 1124 is configured to abut and be fixed against the enclosed interior surface 706 of the elongate cross member 304. The outer surface 1125 of the mount 1124 is preferably machined such that when the mount 1124 is inserted into the free end of the elongate cross member 304, it is fitted closely to the enclosed interior surface 706. The outer surface 1125 extends in a transverse direction and normal to the surfaces of the inner wall 504 and the outer wall 502 to which the hanger mount 206R is also fixed. The outer surface 1125 comprises a plurality (3) of flat surfaces that are joined to adjacent flat surfaces at corners. The flat surfaces are machined after the hanger mount 206R has been cast. Each of the flat surfaces is disposed at an angle to its adjacent flat surfaces.

The mount 1124 has a plurality (6) of apertures 1128 passing therein that are configured to receive a corresponding third plurality of fasteners 1130 of the first plurality of fasteners 318. Each of the flat surfaces that define the outer surface 1125 has two of the apertures 1128.

The mount 1124 extends inwardly through the inner wall 504 far enough to be received in an open end of the elongate cross member 304. In this position, each of the three flat surfaces that define the outer surface 1125 abuts a corresponding and parallel flat surface defined on the inside surface of the elongate cross member 304. The third plurality of fasteners 1130 (shown here as bolts) extend through a plurality of apertures 1132. The plurality of apertures 1132 extend through the outer wall of elongate cross member 304 and into the hollow interior region 700 of the elongate cross member 304. Having passed through the plurality of apertures 1132, the third plurality of fasteners 1130 are fixed to the mount 1124 by being received in plurality of apertures 1128. In this manner, fasteners extend through the wall of the elongate cross member 304, and are fixed to the mount 1124, thereby securing the mount 1124 to the elongate cross member 304.

Figure 12:
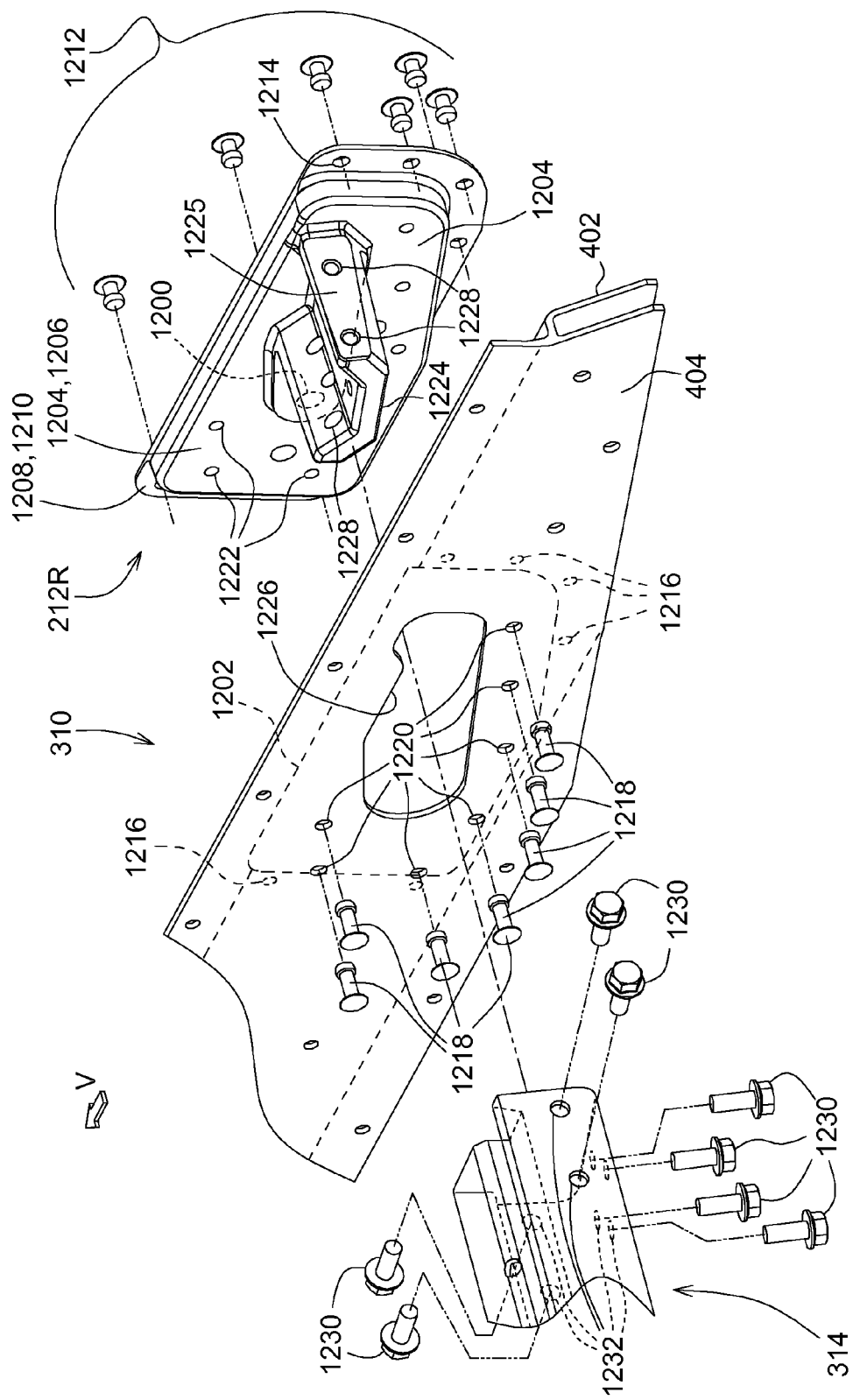
FIG. 12 is a fragmentary exploded perspective view of the right rear corner of the lower sieve frame of FIG. 3

FIG. 12 is an exploded view of the hanger mount 212R, the elongate member 310, and the elongate cross member 314 together with the plurality of fasteners 322. The hanger mount 212R is identical in construction to the hanger mount 212L, but is a mirror image. Thus, the hanger mount and fastener arrangement of the rear of elongate member 310 shown in FIG. 12 is functionally and structurally identical to the hanger mount and fastener arrangement at the rear of the elongate member 308.

Hanger mount 212R is comprised of metal, for example a ferrous metal, such as steel, iron, or nodular iron. It may also be a light metal alloy. Hanger mount 212R has a hanger connection 1200 that is configured to be coupled to and support the hanger 112 (FIG. 2) for reciprocating movement with respect to the hanger mount 212R. The hanger mount 212R is configured to be received inside an aperture 1202 that is machined into the outer wall 402 of the elongate member.

The hanger mount 212R defines a first, inner flange 1204 has a generally planar mounting surface 1206 that is configured to abut and be fixed against the inner wall 404. The hanger mount 212R defines a second, outer flange 1208 that defines a generally planar mounting surface 1210 that is configured to abut and be fixed against the outer wall 402. The portion of the generally planar mounting surface 1206 that abuts the inner wall 404 and the portion of the generally planar mounting surface 1010 that abuts inside surface of the outer wall 402 are parallel.

The plurality of fasteners 330 includes a first plurality of fasteners 1212, (shown as blind rivets), that extend through a corresponding plurality of apertures 1214 formed in the second, outer flange 1208 and are received into a corresponding plurality of apertures 1216 formed in the outer wall 402 of elongate member 310. The plurality of fasteners 330 includes a second plurality of fasteners 1218 that are configured to extend through a corresponding plurality of apertures 1220 formed in the inner wall 404 and are received into a corresponding plurality of apertures 1222 in the first, inner flange 1204. Thus, the hanger mount 212R is fixed to the elongate member 310. Each of the first plurality of fasteners 1212 and the second plurality of fasteners 1218 have longitudinal axes that are parallel and extend laterally, parallel to the longitudinal extent of the elongate cross member 314.

The hanger mount 212R defines an elongate, laterally-extending mount 1224. Mount 1224 extends through an aperture 1226 in the elongate member 310. It is fixed at its outer end to inner flange 1204, and its inner end is cantilevered into the space between the elongate member 308 and the elongate member 310. An outer surface 1225 of the mount 1224 is configured to abut and be fixed against the enclosed interior surface 806 of the elongate cross member 314. The outer surface 1225 of the mount 1224 is preferably machined such that when the mount 1224 is inserted into the free end of the elongate cross member 314, it is fitted closely to the enclosed interior surface 806. The outer surface 1225 extends in a transverse direction and normal to the surfaces of the inner wall 404 and the outer wall 402 to which the hanger mount 212R is also fixed. The outer surface 1225 comprises a plurality (3) of flat surfaces that are joined to adjacent flat surfaces at corners. The flat surfaces are machined after the hanger mount 212R has been cast. Each of the flat surfaces is disposed at an angle to its adjacent flat surfaces.

The mount 1224 has a plurality of apertures 1228 passing therein that are configured to receive a corresponding third plurality of fasteners 1230 of the first plurality of fasteners 330. Each of the flat surfaces that define the outer surface 1225 has two of the apertures 1228.

The mount 1224 extends inwardly through the inner wall 404 far enough to be received in an open end of the elongate cross member 314. In this position, each of the three flat surfaces that define the outer surface 1225 abuts a corresponding and parallel flat surface defined on the inside surface of the elongate cross member 314. The third plurality of fasteners 1230 (shown here as bolts) extend through a plurality of apertures 1232. The plurality of apertures 1232 extend through the outer wall of elongate cross member 314 and into the hollow interior region 808 of the elongate cross member 314. Having passed through the plurality of apertures 1232, the third plurality of fasteners 1230 are fixed to the mount 1224 by being received in the plurality of apertures 1228. In this manner, the fasteners extend through the wall of the elongate cross member 314, and are fixed to the mount 1224, thereby securing the mount 1224 to the elongate cross member 314.

Figure 13:
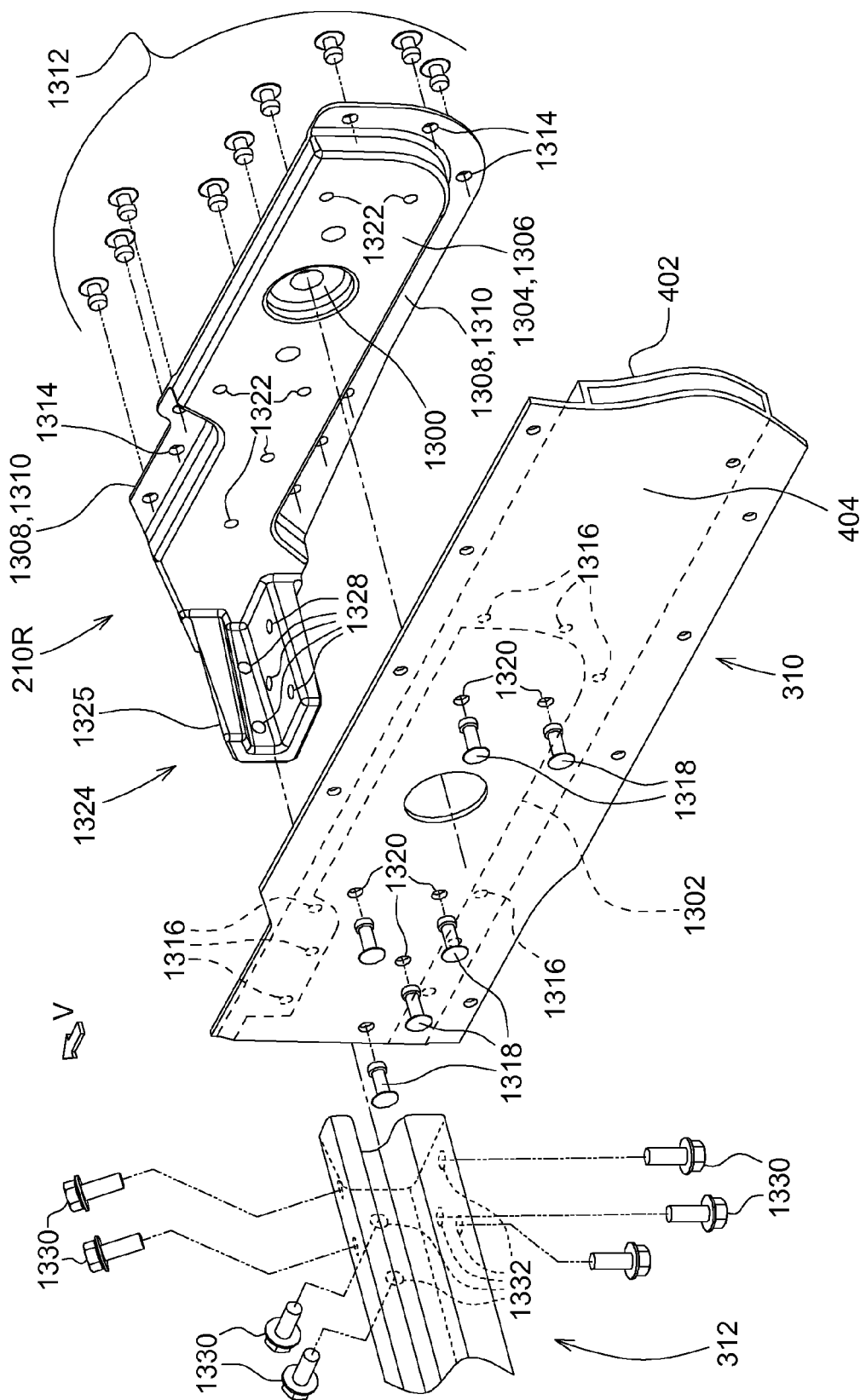
FIG. 13 is a fragmentary exploded perspective view of the right front corner of the lower sieve frame of FIG. 3

FIG. 13 is an exploded view of the hanger mount 210R, the elongate member 310, and the elongate cross member 312 together with the plurality of fasteners 326. The hanger mount 210R is identical in construction to the hanger mount 210L, but is a mirror image. Thus, the hanger mount and fastener arrangement of the front of elongate member 310 shown in FIG. 13 is functionally and structurally identical to the hanger mount and fastener arrangement at the front of the elongate member 308.

Hanger mount 210R is comprised of metal, for example a ferrous metal, such as steel, iron, or nodular iron. It may also be a light metal alloy. Hanger mount 210R has a hanger connection 1300 that is configured to be coupled to and support the hanger 112 (FIG. 2) for reciprocating movement with respect to the hanger mount 210R. The hanger mount 210R is configured to be received inside an aperture 1302 that is machined into the outer wall 402 of the elongate member.

The hanger mount 210R defines a first, inner flange 1304 having a generally planar mounting surface 1306 that is configured to abut and be fixed, against the inner wall 404. The hanger mount 210R defines a second, outer flange 1308 that defines a generally planar mounting surface 1310 that is configured to abut and be fixed against the outer wall 402. The portion of the generally planar mounting surface 1306 that abuts the inner wall 404 and the portion of the generally planar mounting surface 1310 that abuts the surface of the outer wall 402 are parallel.

The plurality of fasteners 326 includes a first plurality of fasteners 1312, (shown as blind rivets), that extend through a corresponding plurality of apertures 1314 formed in the second, outer flange 1308 and are received into a corresponding plurality of apertures 1316 formed in the outer wall 402 of elongate member 310. The plurality of fasteners 326 includes a second plurality of fasteners 1318 that are configured to extend through a corresponding plurality of apertures 1320 formed in the inner wall 404 and are received into a corresponding plurality of apertures 1322 in the first, inner flange 1304. Thus, the hanger mount 210R is fixed to the elongate member 310. Each of the first plurality of fasteners 1312 and the second plurality of fasteners 1318 have longitudinal axes that are parallel and extend laterally, parallel to the longitudinal extent of the elongate cross member 312.

The hanger mount 210R defines an elongate, laterally-extending mount 1324. Mount 1324 is fixed at its outer end to inner flange 1304, and its inner end is cantilevered into the space between the elongate member 308 and the elongate member 310. An outer surface 1325 of the mount 1324 is configured to abut and be fixed against the enclosed interior surface 616 of the elongate cross member 312. The outer surface 1325 of the mount 1324 is preferably machined such that when the mount 1324 is inserted into the free end of the elongate cross member 312, it is fitted closely to the enclosed interior surface 616. The outer surface 1325 extends in a transverse direction and normal to the surfaces of the inner wall 404 and the outer wall 402 to which the hanger mount 21 OR is also fixed. The outer surface 1325 comprises a plurality (3) of flat surfaces that are joined to adjacent flat surfaces at corners. The flat surfaces re machined after the hanger mount 210R has been cast. Each of the flat surfaces is disposed at an angle to its adjacent flat surfaces.

The mount 1324 has a plurality (7) of apertures 1328 passing therein that are configured to receive a corresponding third plurality of fasteners 1330 of the first plurality of fasteners 326. Two of the flat surfaces that define the outer surface 1325 have two of the apertures 1328. One of the flat surfaces that defines the outer surface 1325 has three of the apertures 1328.

The mount 1324 extends inwardly through the inner wall 404 far enough to be received in an open end of the elongate cross member 312. In this position, each of the three flat surfaces that define the outer surface 1325 abuts a corresponding and parallel flat surface defined on the inside surface of the elongate cross member 312. The third plurality of fasteners 1330 (shown here as bolts) extend through a plurality of apertures 1332. The plurality of apertures 1332 extend through the outer wall of elongate cross member 312 and into the hollow interior region 600 of the elongate cross member 312. Having passed through the plurality of apertures 1332, the third plurality of fasteners 1330 are fixed to the mount 1324 by being received in the plurality of apertures 1328. In this manner, fasteners extend through the wall of the elongate cross member 312, and are fixed to the mount 1324, thereby securing the mount 1324 to the elongate cross member 312.

All eight of the hanger mounts are connected to their respective longitudinally extending elongate members and transversely extending elongate cross members in a particularly advantageous arrangement.

This arrangement is particularly advantageous in that it permits each hanger mount to serve as a common support for both the longitudinally extending elongate member and the transversely extending elongate cross member to which it is fixed. This arrangement reduces assembly time and machining operations. Each hanger mount provides a common connection between its associated longitudinally extending elongate member and transversely extending elongate cross member. Each hanger mount is coupled to both an associated longitudinally extending elongate member and an associated transversely extending elongate cross member.

Loads applied to longitudinally extending elongate members are transmitted directly to the hanger mounts. Loads applied to the transversely extending elongate cross members are also transmitted directly to the hanger mounts.

In contrast to this, prior art arrangements transmitted the loads from the laterally extending frame members to the longitudinally extending frame members, and from the longitudinally extending frame members to the hanger mounts. Thus, the longitudinally extending frame members had to be constructed sufficiently strong to not only support loads applied to them directly, but also to support and convey loads applied to the laterally extending frame members.

Further advantages are achieved by providing a hanger mount having a first, inner flange fixed to an inner wall of a longitudinally extending elongate member and a second, outer flange fixed to the outer wall of the same longitudinally extending elongate member, the hanger mount is capable of transmitting loads to both the inner wall and the outer wall of a tubular section of the longitudinally extending elongate member.

This arrangement distributes the load more evenly into the longitudinally extending elongate member. Further, this arrangement holds the inner wall and the outer wall a predetermined distance apart, and therefore helps prevent the longitudinally extending elongate member from buckling under loads. Such buckling could cause the inner wall and the outer wall to either collapse toward or away from each other. By separately fixing the hanger mount to the inner wall and to the outer wall the spacing between the inner wall and the outer wall is maintained constant even under relatively high loads.

Further advantages are achieved by fastening each hanger mount to the longitudinally extending elongate member with fasteners that extend into and terminate within their respective tubular sections, such as the hollow interior region provided in all of the longitudinally extending elongate members and laterally extending elongate cross members, the ends of the fasteners are protected from the environment and thus are less likely to experience corrosion and the weakening of the mechanical connection between the blind rivets and the wall of the elongate member 302. This is of particular concern given the cyclical loads applied by the hangers 110, 112 to the frames 118, 122 of the upper and lower sieve assemblies 106, 108.

Further advantages are achieved by providing longitudinally extending elongate members to form the fore-and-aft side members of the sieve frame. This permits the side members to be made lighter.

It should be understood that the particular arrangements shown and described in this document are not the only ways in which the invention can be created. The arrangements shown in this document are the currently preferred embodiments of the invention. However, one skilled in the art of agricultural harvester design and manufacture can readily see other variations that would also be protected by the claims of this document.

We claim:

1. An agricultural harvester including a hanger mount (206R, 206L, 208R, 208L, 210R, 210L, 212R, 212L) in combination with a reciprocating sieve assembly (106, 108) having a left side longitudinal member (300, 308), a right side longitudinal member (302, 310), a forward transverse member (304, 312) extending between and having opposite ends fixed to the right and left side longitudinal members, and a rearward transverse member (306, 314) extending between and having opposite ends fixed to the right and left side longitudinal members, wherein the hanger mount is a unitary body that comprises:

an upright first mounting surface (1006, 1010, 1106, 1110, 1206, 1210, 1306, 1310) that is engaged with, and fixed to one of the left side longitudinal member (300, 308) and the right side longitudinal member (302, 310);

a hanger connection (1000, 1100, 1200, 1300) that is configured at a central location in said first mounting surface (1006, 1010, 1106, 1110, 1206, 1210, 1306, 1310) and adapted to be coupled to an end of a reciprocating hanger (110, 112); and a laterally extending second mounting surface (1025, 1125, 1225, 1325) having an outer end fixed to said first mounting surface and being engaged with, and fixed to an end region of one of the forward transverse member (304, 312) and the rearward transverse member (306, 314).

2. The combination, as set forth in claim 1, wherein the left side longitudinal member (300, 308) and the right side longitudinal member (302, 310) each have inner and outer upright walls (402, 404, 502, 504) and said first mounting surface (1006, 1010, 1106, 1110, 1206, 1210, 1306, 1310) being fixed against the inner and outer upright walls (402, 404, 502, 504) of said one of the left side longitudinal member (300, 308) and the right side longitudinal member (302, 310).

3. The combination, as set forth in claim 1, wherein said one of the forward transverse member (304, 312) and the rearward transverse member (306, 314) has a laterally extending surface (706, 616, 906, 806), and the laterally extending second mounting surface (1025, 1125, 1225, 1325) is engaged, with and fixed against the surface (616, 706, 806, 906) of said one of the forward transverse member (304, 312) and the rearward transverse member (306, 314).

4. The combination, as set forth in claim 1, wherein the first mounting surface (1006, 1010, 1106, 1110, 1206, 1210, 1306, 1310) is normal to the second mounting surface (1025, 1125, 1225, 1325).

5. The combination, as set forth in claim 1, wherein said one of the left side longitudinal member (300, 308) and right side longitudinal member (302, 310) has a planar inner wall (504, 404) and a planar outer wall (502, 402); the first mounting surface (1006, 1010, 1106, 1110, 1206, 1210, 1306, 1310) including a generally planar first inner flange (1004, 1104, 1304) engaged with, and fixed to the inner wall (504, 404) and including a generally planar first outer flange (1008, 1108, 1308) engaged with, and fixed to the outer wall (502, 402).

6. The combination, as set forth in claim 5, wherein the inner walls (404, 504) and outer walls (402, 502) define at least a longitudinally extending tubular portion of the one of the left side longitudinal member (300, 308) and the right side longitudinal member (302, 310), and said outer wall (402, 502) containing an aperture (1102 and 1302) having said hanger mount (206L, 206R and 210L, 210R) respectively received therein.

7. The combination, as set forth in claim 6, wherein the second mounting surface (1325) of the hanger mount (210R, 210L) extends laterally at a forward end of the hanger mount, with the mounting surface (1325) being immediately forward of a forward end of one of the left side longitudinal member (300, 308) and the right side longitudinal member (302, 310).

8. The combination, as set forth in claim 6, wherein each of the plurality of apertures (1014, 1022, 1114, 1122, 1214, 1222, 1314, 1322) is a tubular fastener, and further wherein the tubular fastener is selected from a group comprising a rivet, a bolt, or a rivnut.

9. The combination, as set forth in claim 3, wherein the second mounting surface (1025, 1125, 1225, 1325) has a plurality of apertures (1028, 1128, 1228, 1328) extending therethrough.

10. The combination, as set forth in claim 9, wherein each of the plurality of apertures (1028, 1128, 1228, 1328) extends in a direction normal to the second mounting surface (1025, 1125, 1225, 1325).

11. The combination, as set forth in claim 9, wherein each of the plurality of apertures (1028, 1128, 1228, 1328) is configured to receive a tubular fastener, and further wherein the tubular fastener is selected from a group comprising a tubular rivet, a bolt, or a rivnut.

12. The combination, as set forth in claim 1, wherein the first mounting surface (1006, 1010, 1106, 1110, 1206, 1210, 1306, 1310) is fixed to one of the left side longitudinal member (300, 308) and the right side longitudinal member (302, 310) with fasteners; and wherein the second mounting surface (1025, 1125, 1225, 1325) is fixed to one of the forward transverse member (304, 312) and the rearward transverse member (306, 314) with fasteners.

13. The combination, as set forth in hanger claim 12, wherein the first mounting surface (1006, 1010, 1106, 1110, 1206, 1210, 1306, 1310) has a plurality of apertures (1014, 1022, 1114, 1122, 1214, 1222, 1314, 1322) and further wherein each of the plurality of apertures is configured to receive a corresponding tubular fastener.

14. The combination, as set forth in claim 12, wherein the second mounting surface (1025, 1125, 1225, 1325) has a plurality of apertures (1028, 1128, 1228, 1328), and further wherein each of the plurality of apertures is configured to receive a corresponding tubular fastener.

15. The combination, as set forth in hanger claim 1, wherein at least one of the forward transverse member (304, 312) and the rearward transverse member (306, 314) is an elongate extruded member that defines a closed hollow interior having opposite open ends, and further wherein the second mounting surface (1025, 1125, 1225, 1325) is projects into one of the open ends and is disposed inside the closed hollow interior.

16. The combination, as set forth in claim 1, wherein at least one of the left side longitudinal member (300, 308) and the right side longitudinal member (302, 310) is an elongate extruded member that defines a first wall (402, 404, 502, 504) that is generally vertical, and further wherein the first mounting surface (1006, 1010, 1106, 1110, 1206, 1210, 1306, 1310) is generally vertical and configured to be fixed to the first wall (402, 404, 502, 504).

* * * * *